US011166135B2

(12) United States Patent
Leduc et al.

(10) Patent No.: US 11,166,135 B2
(45) Date of Patent: Nov. 2, 2021

(54) REGISTERING AND ASSOCIATING MULTIPLE USER IDENTIFIERS FOR A SERVICE ON A DEVICE

(71) Applicant: Apple Inc., Cupertino, CA (US)

(72) Inventors: Nelson M. Leduc, San Jose, CA (US); Xudong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,474

(22) Filed: May 29, 2020

(65) Prior Publication Data
US 2020/0382927 A1    Dec. 3, 2020

Related U.S. Application Data

(60) Provisional application No. 62/855,864, filed on May 31, 2019.

(51) Int. Cl.
*H04L 29/06* (2006.01)
*H04W 4/50* (2018.01)
(Continued)

(52) U.S. Cl.
CPC ............ *H04W 4/50* (2018.02); *H04W 8/183* (2013.01); *H04W 8/20* (2013.01); *H04W 12/069* (2021.01); *H04W 60/00* (2013.01)

(58) Field of Classification Search
CPC ... H04W 4/50; H04W 12/069; H04W 12/062; H04W 8/183
See application file for complete search history.

(56) References Cited

U.S. PATENT DOCUMENTS 9,154,948 B2 * 10/2015 Khare .................... G06F 21/31
2010/0077208 A1 * 3/2010 Appiah ............... H04L 63/0823
713/158

(Continued)

FOREIGN PATENT DOCUMENTS

EP        2540052        1/2013

OTHER PUBLICATIONS

International Search Report and Written Opinion from PCT/US2020/035424, dated Sep. 25, 2020, 13 pages.

*Primary Examiner* — Gary Lafontant
(74) *Attorney, Agent, or Firm* — Morgan, Lewis & Bockius LLP

(57) ABSTRACT

Implementations of the subject technology provide for receiving a registration request for registering and associating phone numbers for at least one service on a particular device, where the registration request includes information related to a phone authentication certificate (PAC) that was generated for the particular device. The PAC authenticates that each of the phone numbers is associated with the particular device. The subject system performs an authentication of user identifiers associated with the particular device based at least on the PAC. The subject system performs a registration of at least one service for the particular device using the authenticated user identifiers, in which the registration includes at least one respective handle for accessing the at least one service via each respective user identifier. The subject system transmits to the particular device, information related to the at least one respective handle for accessing the service via each respective user identifier.

20 Claims, 8 Drawing Sheets

(51) Int. Cl.
    *H04W 8/18*     (2009.01)
    *H04W 8/20*     (2009.01)
    *H04W 60/00*     (2009.01)
    *H04W 12/069*     (2021.01)

(56) References Cited

U.S. PATENT DOCUMENTS

| | | | |
|---|---|---|---|
| 2013/0104200 A1* | 4/2013 | Choi | H04L 63/10 |
| | | | 726/4 |
| 2015/0350877 A1 | 12/2015 | Li et al. | |
| 2018/0026982 A1* | 1/2018 | Wei | H04W 12/06 |
| | | | 726/4 |
| 2019/0394189 A1* | 12/2019 | Thirumalai | H04L 63/102 |

* cited by examiner

← 700

| DEVICE | SERVICE | USER IDENTIFIER | HANDLE |
|---|---|---|---|
| "DEVICE 1" | | | |
| | "SERVICE 1" | | |
| | | "USER ACCOUNT IDENTIFIER 1" | |
| | | | "E-MAIL ADDRESS 1" |
| | | | "E-MAIL ADDRESS 2" |
| | | "PHONE NUMBER 1" | |
| | | | "PHONE NUMBER 1" |
| | | "PHONE NUMBER 2" | |
| | | | "PHONE NUMBER 2" |
| | "SERVICE 2" | | |
| | ... | | |
| "DEVICE 2" | | | |
| | "SERVICE 1" | | |
| | | "USER ACCOUNT IDENTIFIER 1" | |
| | | | "E-MAIL ADDRESS 1" |
| ... | | | |
| "DEVICE M" | | | |
| | "SERVICE N" | | |
| | | ... | |

FIG. 7

REGISTERING AND ASSOCIATING MULTIPLE USER IDENTIFIERS FOR A SERVICE ON A DEVICE

CROSS REFERENCE TO RELATED APPLICATIONS

This application claims the benefit of priority to U.S. Provisional Patent Application No. 62/855,864, entitled "Registering and Associating Multiple User Identifiers for a Service on a Device," and filed on May 31, 2019, the disclosure of which is hereby incorporated herein in its entirety.

TECHNICAL FIELD

The present description relates generally to wireless communications between electronic devices, and more particularly to registering multiple associated user identifiers, such as multiple phone numbers, for a particular service on a device.

BACKGROUND

It is increasingly common for a person to own multiple personal electronic devices, such as a smart phone, laptop computer, a tablet computing device, a portable multimedia player, and a wearable device. Many of the users that own multiple devices may access a service through one or more of the multiple devices.

BRIEF DESCRIPTION OF THE DRAWINGS

Certain features of the subject technology are set forth in the appended claims. However, for purpose of explanation, several embodiments of the subject technology are set forth in the following figures.

FIG. 7 illustrates registration information that associates multiple user identifiers for a service on a device in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A mobile device that supports multiple subscriber identity modules (SIMs) may utilize multiple different phone numbers, e.g., a different phone number for each of the SIMs. Similarly, a user may utilize multiple different SIMs (e.g., different phone numbers) on a mobile device that supports a single SIM, such as when travelling. However, in either case, only one of the SIMs may be active in the mobile device at any given time. Thus, if the user registered for a particular service, such as a messaging service, using a phone number corresponding to a particular SIM, the user may effectively be unavailable on that service via the phone number when the corresponding SIM is not active.

The subject technology provides for registering and associating multiple user identifiers, such as phone numbers and/or user account identifiers (which may be associated with one or more e-mail addresses), for a particular service on a device. Thus, the subject technology allows a user to register and associate each of multiple different phone numbers (e.g., corresponding to multiple different SIMs) and/or e-mail addresses (e.g., corresponding to a user account identifier) for a particular service on their mobile device, such as a messaging service on their mobile device, an audio-video conferencing service on their mobile device, or generally any service on their mobile device. The association of the multiple different registered phone numbers allows the user to be reached via the service irrespective of which of the corresponding SIMs is active at any given time.

Figure 1:
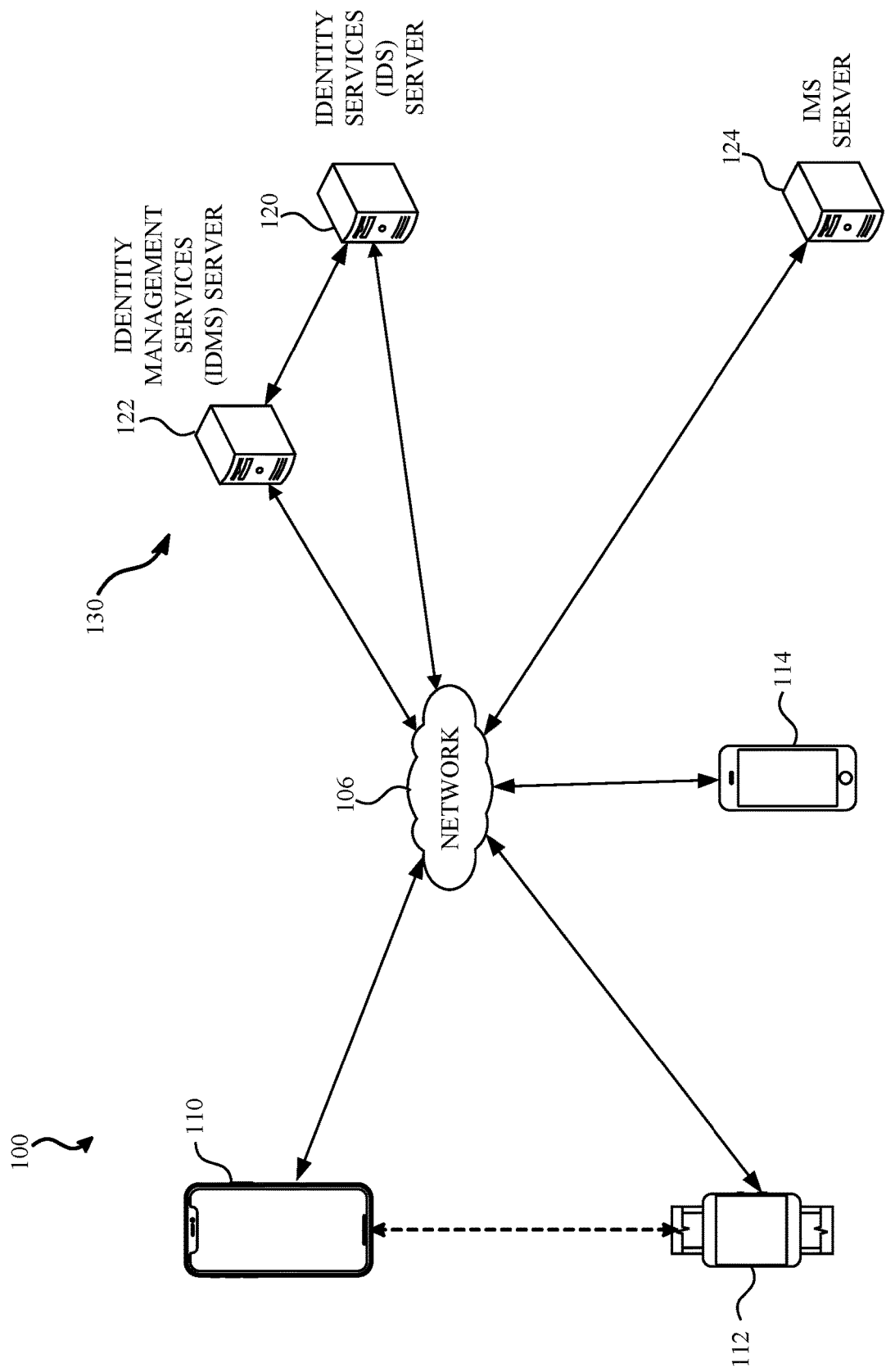
FIG. 1 illustrates an example network environment in which a system for registering and associating multiple user identifiers for a service on a device may be implemented in accordance with one or more implementations.

FIG. 1 illustrates an example network environment 100 in which a system for registering and associating multiple user identifiers for a service on a device may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 112, an electronic device 114, an identity services (IDS) server 120, an identity management services (IDMS) server 122, and an IP multimedia subsystem (IMS) server 124. For explanatory purposes, the network environment 100 is illustrated in FIG. 1 as including the electronic devices 110, 112, 114, the IDS server 120, the IDMS server 122, and the IMS server 124; however, the network environment 100 may include any number of electronic devices and any number of servers or a data center including multiple of the servers in a group of servers 130. Moreover, as further illustrated, some of the servers in the group of servers 130 may be communicatively coupled with another server within the group of servers 130 to facilitate sending and/or receiving messages to and from each server as discussed further herein.

The network 106 may communicatively (directly or indirectly) couple, for example, the electronic device 110 with the IDS server 120, the IDMS server 122, and/or the IMS server 124. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer, a peripheral device (e.g., a digital camera, headphones), a tablet device, a wearable device such as a watch, a band, and the like, any other appropriate device that includes, for example, one or more wireless interfaces such as cellular radios, near-field communication (NFC) radios, WLAN radios, Bluetooth radios, Zigbee radios, and/or other wireless radios. In FIG. 1, by way of example, the electronic device 110 is depicted as a mobile smartphone device. In one or more implementations, the electronic device 110 may be, and/or may include all or part of, the electronic device discussed below with respect to the electronic system discussed below with respect to FIG. 8.

The electronic device 112 may be, for example, a wearable device, or generally any device that includes display circuitry and one or more wireless interfaces, such as cellular radios, near-field communication (NFC) radios, WLAN radios, Bluetooth radios, Zigbee radios, and/or other wireless radios. In FIG. 1, by way of example, the electronic device 112 is depicted as a watch.

The electronic device 112 may be paired, such as via Bluetooth, with one or more of the electronic devices 110 or 114. Two or more of the electronic devices 110, 112 and 114, such as the electronic devices 110 and 112 may be paired together. After two of the electronic devices 110, 112 and 114 are paired together, the devices may automatically form a peer-to-peer connection when located proximate to one another, such as within Bluetooth communication range of one another. However, in one or more implementations, one or more of the electronic devices 110, 112 and 114, may only support a particular number of simultaneous peer-to-peer connections, and/or may only support multiple peer-to-peer connections with specific devices.

In one or more implementations, one or more of the electronic devices 110, 112, 114, such as the electronic device 112, may not include cellular circuitry (or a cellular interface) for communicating with cellular network equipment, such as the IMS server 124. In this instance, the electronic device 112 may utilize Wi-Fi calling to register for services, such as IMS services, via the network 106, so that the electronic device 112 is directly reachable by the IMS server 124 for call routing.

For explanatory purposes, a communication session is primarily described herein as being a cellular communication session, e.g. a cellular phone call. However, a communication session may be, for example, a video call, a Wi-Fi call, a VoIP call, an intercom call, a push-to-talk (PTT) call, a D2D call, or generally any communication between two or more of the electronic devices 110, 112 and 114.

The IDS server 120 and/or the IDMS server 122 may form all or part of a network of computers or the group of servers 130, such as in a cloud computing or data center implementation. The IDS server 120 and/or the IDMS server 122, for example, may provide identity services and may manage credentials associated with the electronic device 110. The IDS server 120 may also issue a phone authentication certificate based on such credentials. Further, the IDS server 120 and/or the IDMS server 122 may provide various authentication and registration services in response to requests for registration from the electronic device 110 as discussed further below.

In an example, the IDS server 120 and/or the IDMS server 122, which may form the group of servers 130, may be associated with a particular service provider or entity, e.g. different from a cellular service provider. Moreover, the IDS server 120 can be combined with the IDMS server 122 in at least an implementation, and/or one or more of the IDS server 120 and/or the IDMS server 122 may not be included in one or more implementations. In one or more implementations, one or more of the electronic devices 110, 112, 114 may be associated/registered with a user account with the service provider. For example, the electronic devices 110, 112, 114 may each be associated with a same user account, or one or more of the electronic devices may be associated with a different user account.

The IMS server 124, in an example, provides access to IMS services including functionality related to an IMS gateway that enables the electronic device 110 to send or receive IP multimedia services to or from a telecommunications network. The IMS server 124 may be external to the group of servers 130, in an example, where the IMS server 124 may be provided by a third party different than the service provider associated with the group of servers 130 and/or different from the cellular service provider. In one or more implementations, the IMS server 124 may facilitate one or more registration processes initiated by the electronic device 110 and performed by one or more servers of the group of servers 130, such as by querying and/or processing registration requests. The subject system allows the group of servers 130 and the electronic device 110 to perform some or all of the registration processes without facilitation from the IMS server 124. Although a single IMS server is discussed, multiple IMS servers may be utilized.

The IDS server 120 and/or the IDMS server 122 may perform a process of registering and associating multiple user identifiers for at least one service on a device. In an example, the IDMS server 122 may authenticate user identifiers (e.g., phone numbers, user account identifiers, etc.). The IDMS server 122 may obtain and/or generate handle information of the users for delivery to the IDS server 120. The IDS server 120 may then register the authenticated user identifiers for each service and for each device. The registration process includes having the IDS server 120 obtain all services on all devices registered to the user account corresponding to the device from which a registration request was received. The IDS server 120 may further update a registration data store (or database). The IDS server 120 can send push notifications or messages to devices containing the multiple user identifier registrations via the IDMS server 122. In some implementations, the IDS server 120 may be deployed to handle entitlement requests conferring capability and/or security permissions, such as for enabling services such as Wi-Fi calling, VoLTE, etc.

Figure 2:
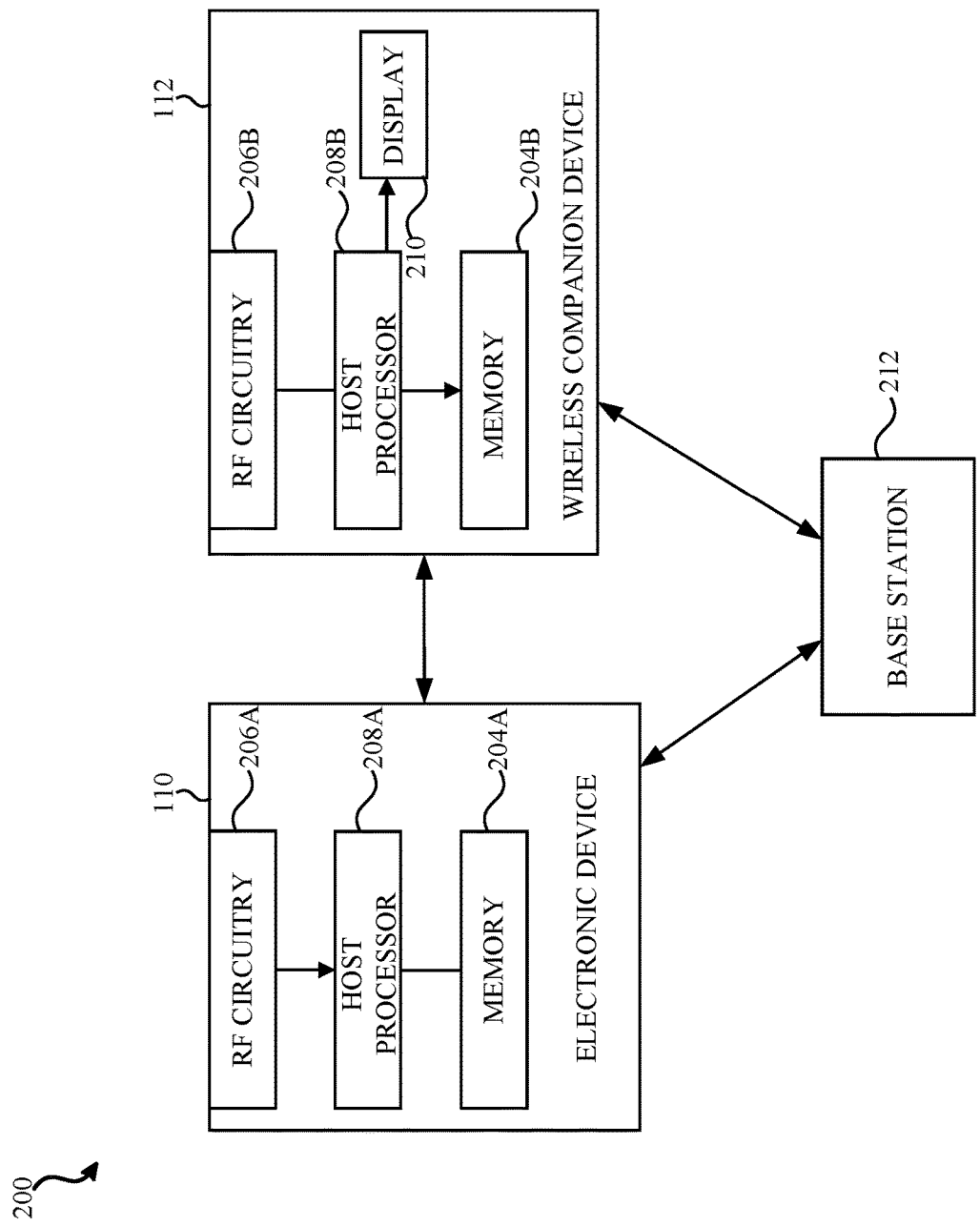
FIG. 2 illustrates an example peer-to-peer network environment including the example electronic device and the example wireless companion device, including communication with a base station, in accordance with one or more implementations.

FIG. 2 illustrates an example peer-to-peer network environment 200 including the example electronic device 110 and the example electronic device 112 (depicted as a wireless companion device), including communication with a base station 212, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 110 may include a host processor 208A, a memory 204A, and radio frequency (RF) circuitry 206A. The electronic device 112 may include a host processor 208B, a memory 204B, RF circuitry 206B, and a display 210.

The RF circuitry 206A,B may include one or more antennas and one or more transceivers for transmitting/receiving RF communications, such as WiFi, Bluetooth, cellular, and the like. In one or more implementations, the RF circuitry 206A of the electronic device 110 may include circuitry for forming wide area network connections and peer-to-peer connections, such as WiFi, Bluetooth, and/or cellular circuitry, while the RF circuitry 206B of the electronic device 112 may only include Bluetooth, WiFi, and/or other circuitry for forming peer-to-peer connections. However, in one or more implementations, the RF circuitry 206B of the electronic device 112 may also include circuitry for forming wide area network connections, such as cellular circuitry.

The host processors 208A-B may include suitable logic, circuitry, and/or code that enable processing data and/or controlling operations of the electronic device 110 and the electronic device 112, respectively. In this regard, the host processors 208A-B may be enabled to provide control signals to various other components of the electronic device 110 and the electronic device 112, respectively. Additionally, the host processors 208A-B may enable implementation of an operating system or otherwise execute code to manage operations of the electronic device 110 and the electronic device 112, respectively. The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage.

In one or more implementations, one or more of the host processors 208A-B, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

As noted above, the electronic device 110 may be a mobile phone, a tablet, or any other type of hand-held device, a media player, a computer, a laptop or virtually any type of wireless device. The electronic device 112 may be any of various types of devices that, in some implementations, has a smaller form factor relative to a conventional smart phone, and may have one or more of limited communication capabilities, limited output power, or limited battery life relative to a conventional smart phone. In some implementations, the electronic device 112 may be a smart watch or other type of wearable device.

As another example, the electronic device 112 may be a tablet device, such as an iPad, and may also be capable of communicating with another device (e.g., the electronic device 110), referred to as a proxy device or intermediate device, using a short range communications protocol, and may then use the cellular functionality of this proxy device for communicating cellular voice/data with the base station 212. In other words, the electronic device 112 may provide voice/data packets intended for the base station 212 over the short range link to the electronic device 110, and the electronic device 110 may use its cellular functionality to transmit (or relay) this voice/data to the base station on behalf of the electronic device 112.

The peer-to-peer network environment 200 may facilitate registration and association of multiple user identifiers that can access a same service on a single device, such as the electronic device 110. In some implementations, the electronic device 110 may be a multiple-SIM device that includes multiple physical SIMs (or UICCs). In other implementations, the electronic device 110 may include a physical device identity module (DIM) and one or more electronic SIMs (or e-SIMs). In one or more implementations, the electronic device 112 includes a physical SIM (or electronic SIM) that is separate from the SIMs of the electronic device 110. Each SIM of the device may be represented by a user identifier that identifies a phone number associated with the SIM. Each user identifier associated with the electronic device 110 may be mapped to a service as part of the multi-user identifier registration process.

In some implementations, the electronic device 112 may include its own UICC (or SIM card) for accessing services provided by the IMS server 124. In such case, the UICC of the electronic device 112 is associated with a unique user identifier that is then mapped to a service registered with the electronic device 112 as part of the multi-user identifier registration process. In this respect, a registration mapping may include a first user identifier identifying a phone number associated with the electronic device 112 and one or more user identifiers identifying respective phone numbers associated with the electronic device 110 that are mapped to a same service. In some aspects, each of the mapped user identifiers may be queried by a respective handle used to access the service via each respective user identifier.

Figure 3:
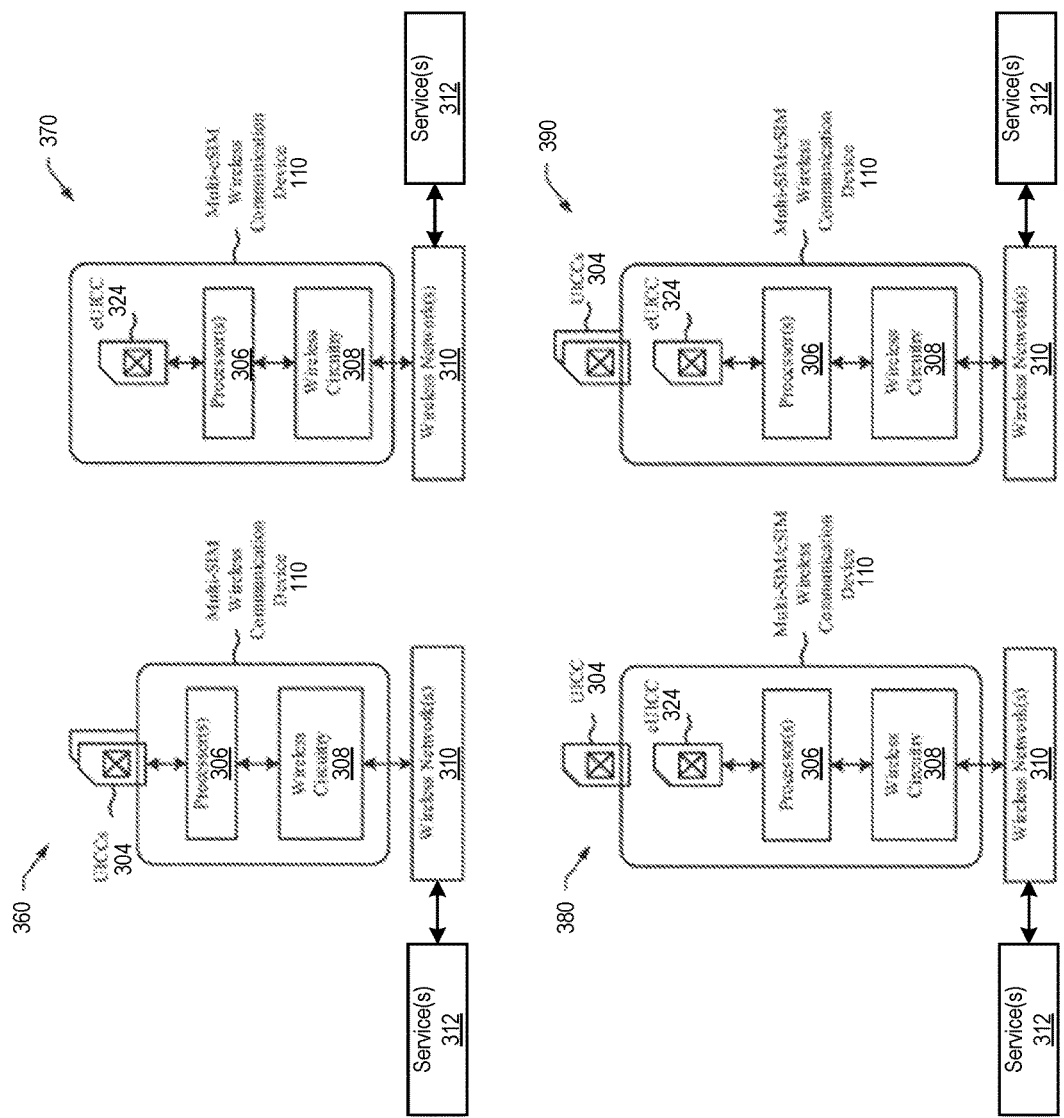
FIG. 3 illustrates diagrams for wireless communication devices that support multiple subscriber identities using removable universal integrated circuit cards (UICCs) and/or embedded UICCs (eUICCs) with subscriber identity modules (SIMs) and/or embedded SIMs (eSIMs) implemented thereon, in accordance with one or more implementations.

FIG. 3 illustrates diagrams 360, 370, 380, 390 for wireless communication devices that support multiple subscriber identities using removable UICCs and/or embedded UICCs (eUICCs) with SIMs and/or eSIMs implemented thereon, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Each of the diagrams 360, 370, 380, 390 depicts components of the electronic device 110 (depicted as a dual SIM wireless communication device) including one or more processor(s) 306 and wireless circuitry 308 that provides for wireless radio frequency (RF) connections between the electronic device 110 and services 312 via wireless network 310. In some implementations, the wireless circuitry 308 includes one or more baseband processor(s), and a set of RF analog front-end circuitry. The processor(s) 306 and the wireless circuitry 308 can be configured to perform and/or control performance of one or more functionalities of the electronic device 110, in accordance with various implementations. The processor(s) 306 and the wireless circuitry 308 can provide functionality for coordinating hardware/software resources in the electronic device 110 to provide for connections to the wireless network 310.

The electronic device 110, in some implementations, can concurrently register with one or more services. The wireless circuitry 308 of the electronic device 110 can be configured to register with and/or establish a connection with the wireless network 310. In some implementations, the wireless circuitry 308 of the electronic device 110 supports transmission of one or more registration requests and reception of one or more registration responses to the services 312 via the wireless networks 310. In some implementations, the wireless circuitry 308 of the electronic device 110 supports transmission and reception of only one user registration to the services 312 via the wireless networks 310 at a time. As the electronic device 110 can register multiple UICCs with a same service via different user identifiers, the electronic device 110 can appear to the service as two or more distinct user identifiers (each corresponding to a different phone number).

As illustrated in diagram 360, the electronic device 110 includes multiple UICCs 304, which can be inserted and removed individually or together, and communicate with one or more processors 306 that connect to wireless circuitry 308 that provides for wireless communication with one or more wireless networks 310. As the physical size and design of the electronic device 110 can limit the number of UICCs 304 that can be supported, alternatively, as illustrated in diagram 370, the electronic device 110 can include an embedded UICC (eUICC) 324 connected with the processor(s) 306 and to the wireless network(s) 310 via the wireless circuitry 308. The eUICC 324 can be built into the electronic device 110 and may not be removable from the electronic device 110, e.g., permanently affixed to a circuit board in the electronic device 110. The eUICC 324 can be programmed such that one or more electronic SIMs (eSIMs) can be implemented on the eUICC 324. Each eSIM can be associated with a distinct subscriber identity and/or provide distinct cellular services and/or subscriptions for a user of the electronic device 110.

Diagram 380 illustrates an electronic device 110 that includes a removable UICC 304, on which can be installed one or more SIMs, and an eUICC 324 on which one or more eSIMs can be installed. The combination of SIMs on the UICC 304 and/or eSIMs on the eUICC 324 can provide for connections to one or more wireless networks 310 using the wireless circuitry 308 under the control of the processor(s) 306 of the electronic device 110. Diagram 390 illustrates another electronic device 110 that includes multiple UICCs 304, on which one or more SIMs can be installed, and an eUICC 324, on which one or more eSIMs can be installed. The combination of SIMs on the UICCs 304 and/or eSIMs on the eUICC 324 can provide for connections to one or more wireless networks 310 using the wireless circuitry 308 under the control of the processor(s) 306 of the electronic device 110.

In some aspects, the electronic device 110 that supports multiple subscriber identities can include at least one UICC 304 or at least one eUICC 324 or both. Each UICC 304 can support one or more SIMs, and each eUICC 324 can support one or more eSIMs. An electronic device 110 that supports multiple subscriber identities can include a combination of SIMs and/or eSIMs to support communication with one or more wireless networks 310.

Figure 4:
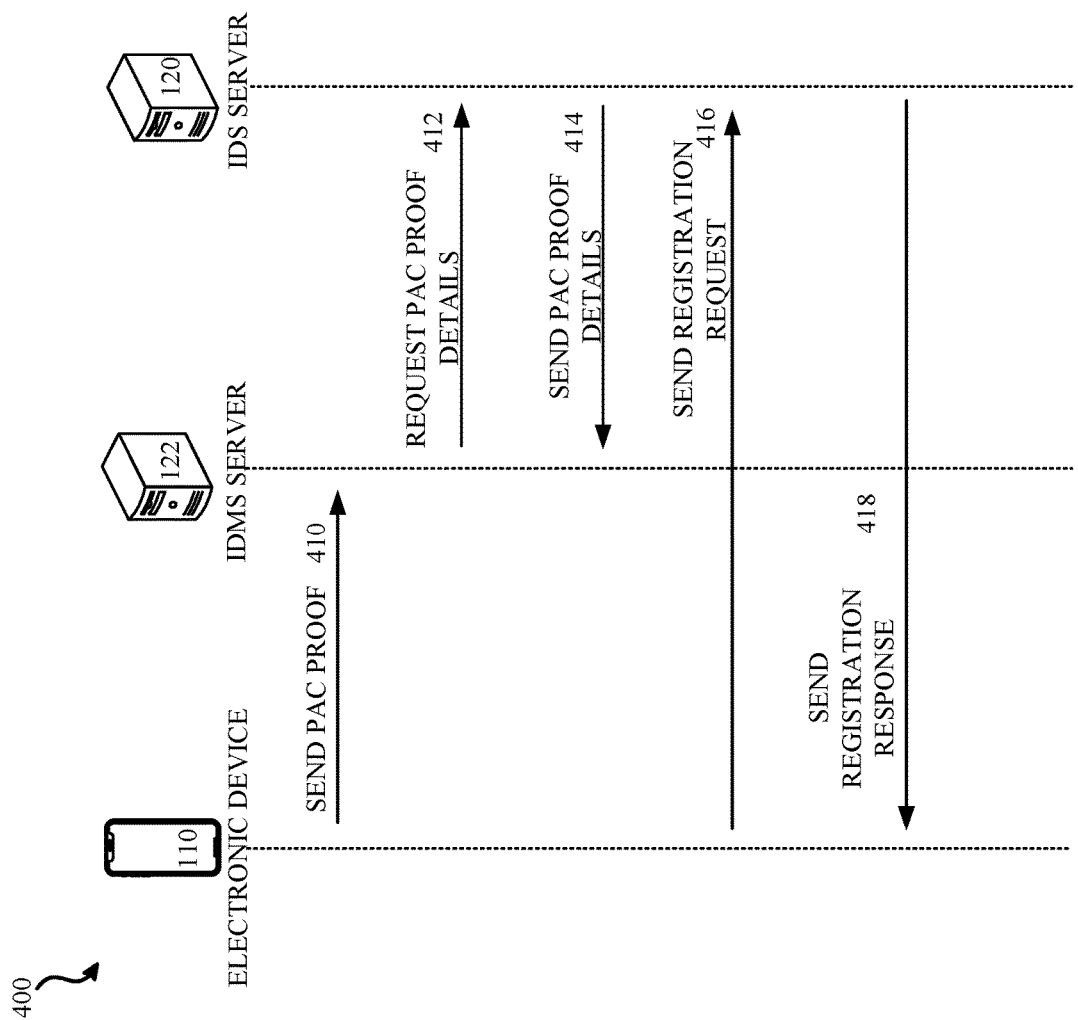
FIG. 4 illustrates an example sequence diagram for initiating registration and association of multiple phone numbers for a service on an electronic device using information for verifying that each of the phone numbers is associated with the electronic device, in accordance with one or more implementations.

FIG. 4 illustrates an example sequence diagram 400 for initiating registration and association of multiple phone numbers for a service on an electronic device using information for verifying that each of the phone numbers is associated with the electronic device, in accordance with one or more implementations. FIG. 4 is discussed with reference to components of FIG. 1, namely the electronic device 110, the IDMS server 122 and the IDS server 120. As shown, the diagram shows interactions between the electronic device 110, the IDMS server 122, and the IDS server 120. For explanatory purposes the phone authentication certificate (PAC) validation is described herein with reference to the IDMS server 122; however, the PAC validation system may be used by multiple different services, such as communication services, and the like. For example, an API may be provided that allows other services to utilize the PAC validation system.

The electronic device 110 may initiate a registration for a service on a device by authenticating one or more user identifiers, e.g. phone numbers, with phone authentication certificate (PAC) information (and/or a digital signature). The digital signature may be used as a way of establishing trust that a particular user identifier is legitimate. The electronic device 110 may begin the registration by sending a request 410 for validating a PAC, where the request 410 may include information providing proof of the PAC ("PAC proof"). The information related to the proof of the PAC, for example, may be used to confirm that the PAC was generated for the electronic device 110 and/or to authenticate that the user identifier is a phone number associated with the PAC. In one or more implementations, the PAC includes a machine identifier (MID) associated with the electronic device 110 and the PAC proof details may include the MID in an implementation.

The MID may be associated with the electronic device 110 by being assigned to the electronic device 110 (e.g., by the IDMS server 122), by being included in firmware of the electronic device 110, by being included on the electronic device 110 at the time of manufacture, etc. The MID in an example is verified and associated with the electronic device 110 prior to requesting the PAC. The IDMS server 122, after receiving the request 410 including the PAC proof, communicates with the IDS server 120 to validate the PAC proof. The IDMS server 122 sends a request 412 for information regarding details for validating the PAC proof to the IDS server 120, where the request 412 includes the PAC proof. The IDS server 120, after receiving the request 412, analyzes the information included in the PAC proof and sends a response 414 including the details for validating the PAC proof. The IDS server 120, for example, validates that the PAC is valid (e.g., by using one or more certificates stored at the IDS server 120), and that the signature included in the PAC proof is valid. In some implementations, the IDS server 120 may authenticate a phone number and PAC for multiple SIMs used by the electronic device 110.

In an implementation, the details for validating the PAC proof, as provided in the response 414, include information such as, but not limited to, a phone number, a push token (e.g., the credentials associated with the electronic device 110), a MID, a usage timestamp related to when the PAC was last used by a service, a generation timestamp related to when the PAC was generated, a validation strength (e.g., basic, intermediate, maximum) which may be configured by an administrator for use by the IDMS server 122, and a status of the PAC (e.g., valid, invalid, expired, etc.).

After receiving the details for validating the PAC proof from the response 414, the IDMS server 122 determines whether the PAC proof is validated based on one or more of the following conditions, which may be based on information provided in the PAC proof and/or by further querying the IDS server 120. The PAC is required to be associated with the phone number that is the trusted phone number for the account, which may be verified based on the phone number included in the PAC. The PAC is required to be younger (e.g., based on the generation timestamp) than the last password change for the account (e.g., for when the electronic device 110 gets stolen and the password is changed). Moreover, the timestamp related to when the PAC was validated is required to be within the predetermined past period of time (e.g., the last 45 days), or the IDS server 120 is required to have utilized the PAC within the predetermined past period of the time based on a timestamp provided by the IDS server 120 to the IDMS server 122. Further, the MID in the PAC is required to match with the MID provided in the response 414. In one or more implementations, after validating the PAC proof, the IDMS server 122 may transmit a response message that includes an indication that the PAC proof was validated to the IDS server 120 and/or to the electronic device 110.

In some implementations, a batch protocol is used to authenticate multiple user identifiers in a single request. The batch protocol may authenticate user identifiers using corresponding phone numbers. In some examples, the request 410 includes the authentication batch request.

In operation, a client device (e.g., the electronic device 110) sends user credentials for each user identifier as a batch in the single request. In some implementations, the user credentials include SMS (short-messaging-service) and/or SMS-less signatures. The IDMS server 122 via the IDS server 120 validates the signatures and may provision PACs in return. In other implementations, the user credentials include phone authentication certificates (PACs). In this respect, the IDMS server 122 validates any passed-in PACs, however, the server does not issue a new PAC to the client device.

In some implementations, the authentication batch request includes a push token, a list of dictionaries containing per-user authentication requests, a user identifier (e.g., a phone number, a user account identifier, or the like), a tag (e.g., a handle corresponding to the user identifier, such as a phone number or an e-mail address), and an authentication certificate. In some implementations, the authentication batch request includes a certificate signature request and a SMS/SMS-less signature in lieu of the authentication certificate.

Based on the above-discussed conditions, the electronic device 110 sends a registration request 416 including an indication that the PAC proof was successfully validated to the IDS server 120.

In some implementations, the registration request 416 includes user identifiers that correspond to one or more of a phone number associated with a SIM of the electronic device 110 or an e-mail address associated with a user account for accessing at least one service. The user identifier may uniquely identify a phone number that is based on one or more hardware identifiers (e.g., an ICC-ID (Integrated Circuit Card ID) of a SIM. The registration request 416 may include a service identifier that identifies the at least one service to be mapped with the registered user. The registration request 416 may also include a device identifier for identifying a device to be mapped with the at least one service and user identifiers registered to the service via that device.

After receiving a request to register a user identifier for a service on a device from the registration request 416, the IDS server 120 registers the information sent from the electronic device 110, and stores an association between the user identifier and the service on the device, in a registration data store. In some implementations, the IDS server 120 performs phone number identification on each of the multiple SIMs of the electronic device 110 from the registration request 416. In some implementations, the IDS server 120 may register a phone number with a user account for each of the multiple SIMs of the electronic device 110. In this respect, the IDS server 120 provides a registration mapping of a same service to all registered phone numbers associated with the electronic device 110. These associations may be formed for each service and for each device, such that a particular device may include a mapping of multiple services registered to the device and another mapping of multiple user identifiers registered to each of the different services. Together, the associated chain of devices, services, and user identifiers identify which handles are linked to a particular service for a particular device.

In some implementations, the IDS server 120 uses a tag for the registration of a user identifier, where the tag represents an alias identifying the user identifier (e.g., phone number prefix or suffix, e-mail address, etc.). The tag may identify a registered user identifier for a device, where the tag for that user identifier may be different for each device. In some aspects, the registration mapping may be indexed by the tag for accessing the service on a respective device via the registered user identifier. In some aspects, the tag may identify a priority for a particular user identifier for accessing the service in a particular order relative to other user identifiers.

The IDS server 120 may generate a registration signature based on the user identifier, service identifier and device identifier, and transmits the registration signature as a registration response 418 to the electronic device 110. In some implementations, the response 418 from the IDS server 120 may include a status of the authentication request discussed above. The response 418 also may include a list of dictionaries containing per-user identifier authentication responses, a user identifier associated with the corresponding authentication response, a per-user identifier authentication status, and an authentication certificate associated with the corresponding authentication response. In some implementations, if multiple user identifiers are registered to the electronic device 110, the electronic device 110 may be configured to obtain registration information for each user identifier with the response 418 from the IDS server 120.

In some implementations, the registration process may not be completed until a user of the electronic device 110 provides user input that serves as a confirmation of the registration. In some aspects, the electronic device 110 and the IDS server 120 may perform a frame exchange that includes user input responsive to one or more prompts from the IDS server 120. For example, the IDS server 120 may prompt a user to select between two or more SIMs for registration. In some aspects, the user may indicate which of the two SIMs is a primary SIM and a secondary SIM, where the primary SIM may be programmed to operate as a default phone number for one or more services. In another example, the IDS server 120 may prompt a user to specify a service for linking between a user account identifier and phone number. In some aspects, the user may indicate which services are accessible via a first phone number and which services are accessible via a second phone number, for example.

In some implementations, the IDS server 120 stores a table that contains a mapping of registrations that indicate linked user identifiers (e.g., a user account linked to multiple phone accounts for a given service on a device). In an example, the IDS server 120 may add new registration entries to the table. In another example, the IDS server 120 may update the table by deleting or modifying an existing registration entry. The table may be stored internally to the IDS server 120 in some implementations, or may be stored on an external database that is accessible to the IDS server 120 in other implementations.

In some implementations, any registry or mapping of authenticated user identifiers to unique services may be used by the IDS server 120 to provide a trusted method of associating the identity of the electronic device 110 with a unique user identifier for a particular service and allowing the electronic device 110 to access the particular service via the user identifier. For example, a link (or association) can be established between a phone number registration and a user account registration for a given service on a device. In some implementations, the IDS server 120 allows another device to use handles corresponding to a linked phone number when a user signs into that other device.

In one or more implementations, upon an event related to a user identifier, the electronic device 110 may re-initiate the aforementioned registration process. In some aspects, the electronic device 110 may detect changes involving the user identifier by listening for event changes from a service provider (e.g., IMS server 124). For example, these changes may include, but are not limited to, i) a change in SIM card information by transferring a SIM card to a new device, ii) a change in carriers (or networks), and/or iii) deactivation of a phone number that causes removal of the associated user identifier from the registration mapping. In other implementations, a server (e.g., the IDS server 120, the IDMS server 122, or combination thereof) may detect these event changes. In some aspects, the server may send a single push message to a device to trigger an action for multiple users registered to a device ("multi-user push"). In other aspects, the server may send a single push message to multiple devices to trigger an action to these multiple devices ("multi-device push"). The example action may include initiating a registration process with respect to the user identifier(s) identified by the push message.

After a user identifier associated with a particular device has been registered, a user at the electronic device 110 may initiate and/or accept a communication session (e.g., voice call, video chat/conference session, instant messaging session, etc.) as will be discussed further in FIG. 5. In one or more implementations, the phone number of an electronic device (e.g., electronic device 110, electronic device 112) and/or an e-mail address of a user account to the requested service may be used, individually or collectively, as the endpoint identifier of a communication session. By way of example, a user at a first electronic device may initiate a communication session with other user(s) at other electronic device(s) to participate in the communication session using their respective handles, which serve as aliases for different phone numbers and/or e-mail addresses registered to a uniquely identified service on a particular device.

Figure 5:
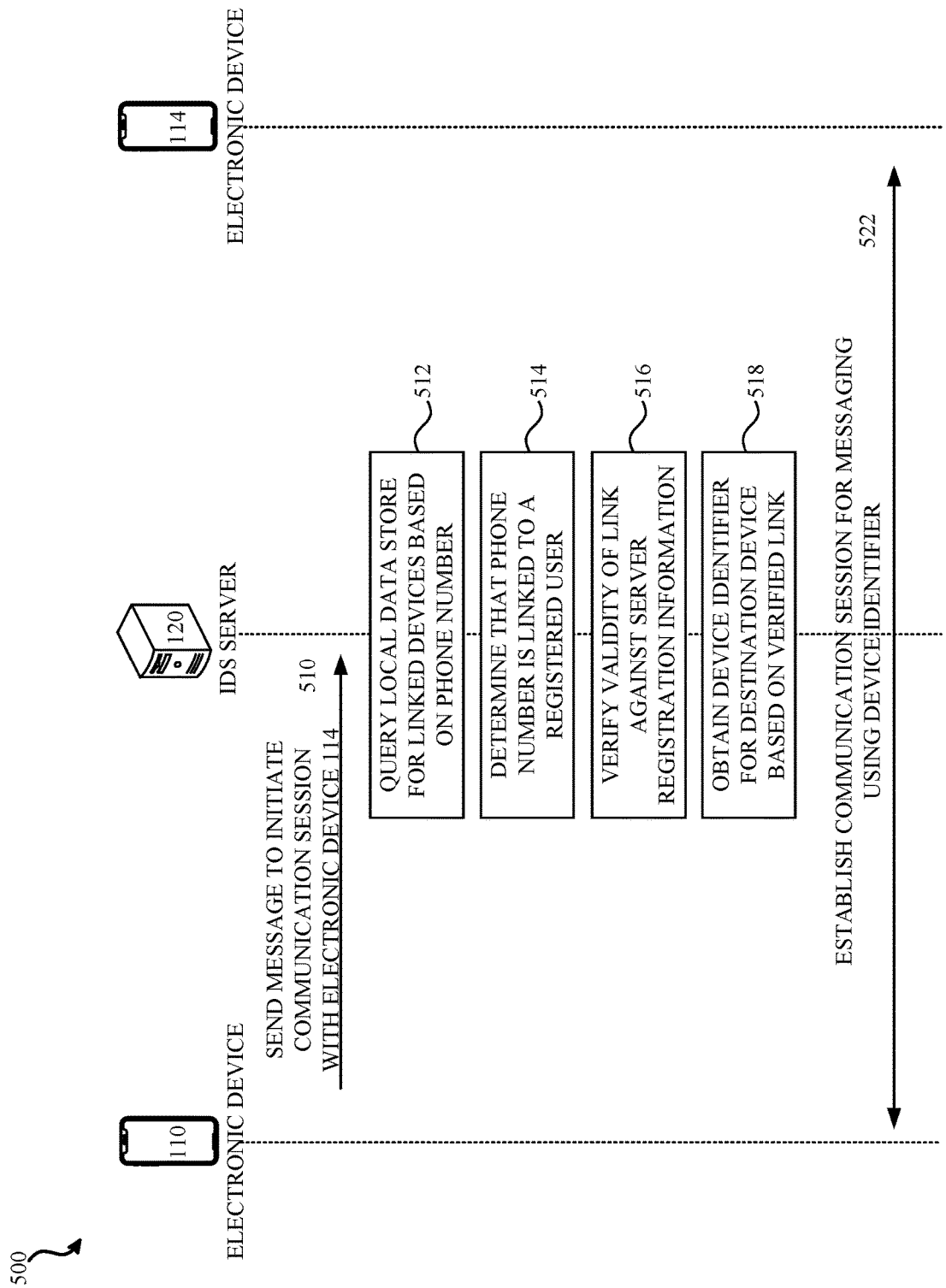
FIG. 5 illustrates an example sequence diagram for initiating a communication session with a destination device via a service through query of registration information by a source device, in accordance with one or more implementations.

FIG. 5 illustrates an example sequence diagram 500 for initiating a communication session with a destination device via a service through query of registration information by a source device, in accordance with one or more implementations. FIG. 5 will be discussed with reference to components of FIG. 1, namely the electronic device 110, the IDS server 120, and the electronic device 114. As shown, the diagram shows interactions between the electronic device 110 and the IDS server 120, and the electronic device 114. For explanatory purposes, the linked device registration validation is described herein with reference to the IDS server 120; however, the linked device registration validation system may be used by multiple different services.

The electronic device 110 may initiate a communication session with the electronic device 114 by sending a message 510 to the IDS server 120. The IDS server 120 may query a local data store for other associated devices based on a phone number associated with the electronic device 114 (512). In some aspects, the IMS server 124 may access a remote data store to identify any registration information corresponding to the phone number. The IDS server 120 may determine that the phone number is linked to a registered user (e.g., a user account for accessing one or more services) (514). The IDS server 120 may verify the validity of the link (or association) of the phone number to the user account using server registration information (516).

In some implementations, the IDS server 120 may obtain registrations for a given user identifier. For example, the IDS server 120 may obtain registration information indicating all services on all devices registered for that user identifier, such as the registration information discussed further below with respect to FIG. 7. In this respect, the IDS server 120 may verify the validity of the registration link from the registration information. The IDS server 120 obtains a device identifier for the destination device (e.g., the electronic device 114) based on the verified registration link (518). The IDS server 120 facilitates establishing the communication session for messaging services between the electronic device 110 and the electronic device 114 using the device identifier (522).

In the communication session, the electronic device 110 and the electronic device 114 may exchange multiple messages over one or more services. In some implementations, the IDS server 120 may merge different message threads associated with respective phone user accounts that are associated with a common user account identifier on a multi-SIM device. For example, if one device (e.g., the electronic device 110) has multiple phone numbers via respective UICCs on the device, then existing conversation threads of a service accessed by the electronic device 110 may be merged onto a common thread for display on the electronic device 110. This is because the same user account accesses the service using different user identities on the same device.

Figure 6:
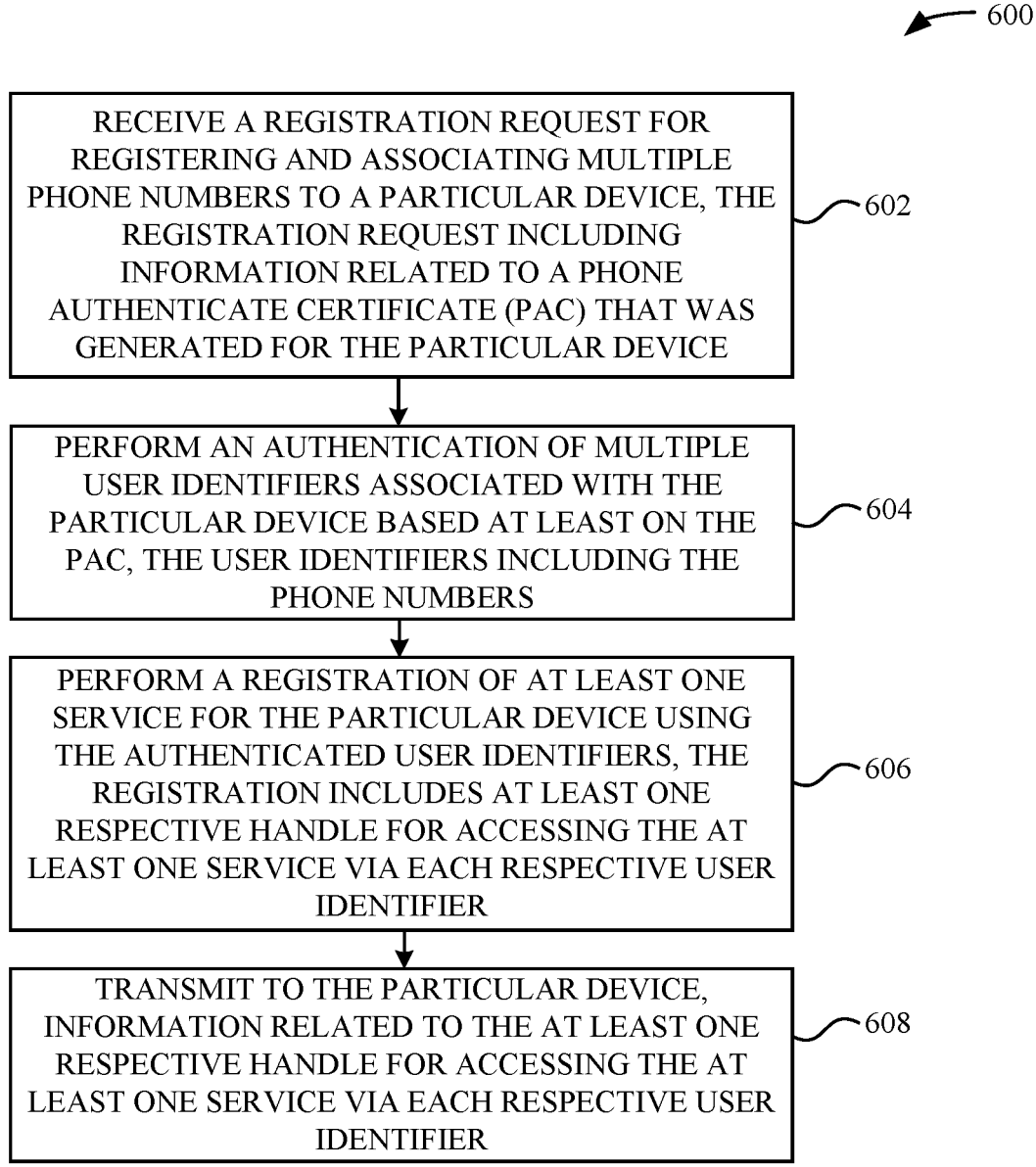
FIG. 6 illustrates a flow diagram of an example process for registering and associating multiple user identifiers for a service on an electronic device in accordance with one or more implementations.

FIG. 6 illustrates a flow diagram of an example process 600 for registering and associating multiple user identifiers for a service on an electronic device, in accordance with one or more implementations. For explanatory purposes, the process 600 is primarily described herein with reference to the IDS server 120 and the IDMS server 122 of FIG. 1. However, the process 600 is not limited to the IDS server 120, and the IDMS server 122 of FIG. 1, and one or more blocks (or operations) of the process 600 may be performed by one or more other components of other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The process 600 begins at step 602, where the IDMS server 122 receives a registration request for registering multiple phone numbers for at least one service on a particular device (e.g., the electronic device 110, the electronic device 112). In some aspects, the registration request includes information related to a PAC that was generated for the particular device. Next, at step 604, the IDS server 120 performs an authentication of multiple user identifiers associated with the particular device based at least on the PAC. In some aspects, the user identifiers include the phone numbers.

Subsequently, at step 606, the IDS server 120 performs a registration of at least one service for the particular device using the authenticated user identifiers. In some aspects, the registration includes at least one respective handle for accessing the at least one service via each respective user identifier. In one or more implementations, the handle may be the same as the user identifier, such as in the instance of a phone number, as is discussed further below with respect to FIG. 7.

Next, at step 608, the IDS server 120 transmits to the particular device, information related to the at least one respective handle for accessing the at least one service via each respective user identifier. For example, the IDS server 120 may provide the particular device with all or part of the registration information discussed further below with respect to FIG. 7.

FIG. 7 illustrates registration information 700 that associates multiple user identifiers for a service on a device in accordance with one or more implementations. In some aspects, the registration information 700 may be a representation of a registration information table that includes multiple devices as individual registration entries. The registration information 700 indicates how each device associated with a given user account is registered to one or more of the services using the user identifiers which may each have multiple handles. The registration information 700 may include registration entries for M devices, where each device may be registered to N services. As depicted in FIG. 7, the registration information 700 includes a first device (depicted as "Device 1") that is registered to a first service (depicted as "Service 1") using a first user identifier (depicted as "User Account Identifier 1"), a second user identifier (depicted as "Phone Number 1"), and a third user identifier (depicted as "Phone Number 2"). The first user identifier may have at least two handles associated with it (depicted as "E-Mail Address 1" and "E-Mail Address 2", respectively), which individually represent e-mail addresses of the corresponding user account. The first device may be registered to a second service (depicted as "Service 2"), along with corresponding user identifiers and handles. A second device (depicted as "Device 2") may be registered to the first service using the first user identifier and associated handles. Although the registration information 700 depicts a registration entry identifying an association between a device, a service, a user identifier and a handle, other identifying information of a device and/or user may be used to represent an association among multiple user identifiers for a service on a device.

Figure 8:
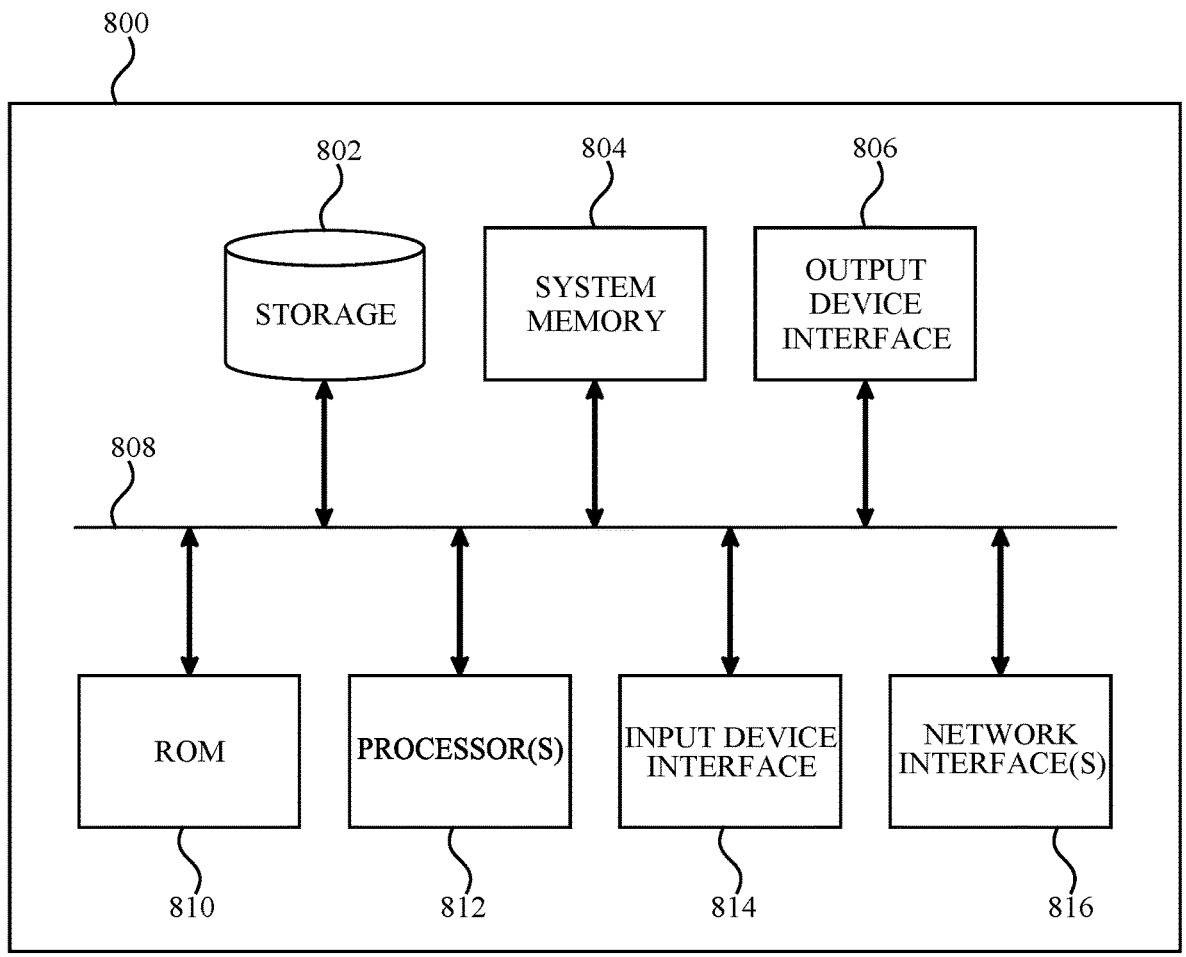
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, one or more of the electronic devices 110, 112, 114, the IDS server 120, the IDMS server 122, and/or the IMS server 124, as shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface (s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

As described above, one aspect of the present technology is the gathering and use of data available from specific and legitimate sources to improve registering and associating multiple user identifiers for a service on a device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine whether to register and/or associate a particular user identifier in accordance with a user's preferences. Accordingly, use of such personal information data enables users to have greater control of the devices for which user identifiers are registered. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of registering and associating multiple user identifiers for a service on a device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, registered and/or associated user identifiers can be provided based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, at a server, a registration request for registering and associating a plurality of phone numbers for at least one service on a particular device, the registration request comprising information related to a phone authentication certificate (PAC) that was generated for the particular device, the PAC authenticating that each of the plurality of phone numbers is associated with the particular device;
performing, by the server, an authentication of a plurality of user identifiers associated with the particular device based at least on the PAC, the plurality of user identifiers comprising the plurality of phone numbers;
performing, by the server, a registration of the at least one service for the particular device using the authenticated plurality of user identifiers, wherein the registration includes at least one respective handle for accessing the at least one service via each respective user identifier; and
transmitting, from the server, to the particular device, information related to the at least one respective handle for accessing the at least one service via each respective user identifier of the plurality of user identifiers including the plurality of phone numbers.

2. The method of claim 1, further comprising performing, by the server, a registration of the at least one service for a plurality of devices, wherein the registration includes at least one respective handle for accessing the at least one service on a respective device via each respective user identifier.

3. The method of claim 2, wherein the performing the authentication comprises performing a batch operation of authenticating the plurality of user identifiers associated with the plurality of devices.

4. The method of claim 1, further comprising:
determining, by the server, whether a particular device is associated with a plurality of handles for accessing the at least one service on the particular device; and
merging, by the server, a plurality of message threads associated with the plurality of handles for accessing the at least one service, into a forked message thread when the particular device is associated with the plurality of handles.

5. The method of claim 1, wherein at least one corresponding user identifier is associated with a corresponding subscriber identity module.

6. The method of claim 1, wherein the registration includes a tag identifying a priority of each of the plurality of user identifiers for accessing the at least one service in a particular order.

7. The method of claim 1, further comprising:
detecting one or more changes associated with at least one of the plurality of user identifiers associated with the particular device; and
sending a push message to the particular device that triggers an action for the at least one of the plurality of user identifiers on the particular device, the push message prompting the particular device to re-register the at least one of the plurality of user identifiers for one or more services accessible through the particular device.

8. The method of claim 1, further comprising:
detecting one or more changes associated with at least one of the plurality of user identifiers associated with a plurality of devices including the particular device; and
sending a push message to the plurality of devices that triggers an action for the at least one of the plurality of user identifiers on each of the plurality of devices, the push message prompting each of the plurality of devices to re-register the at least one of the plurality of user identifiers for one or more services accessible through each respective device.

9. A device comprising:
a memory; and
at least one processor configured to:
receive a registration request for registering and associating a plurality of phone numbers for at least one service on a particular device, the registration request comprising an authentication certificate that authenticates that each of the plurality of phone numbers is associated with the particular device;
authenticate that the plurality of phone numbers are associated with the particular device based at least on the authentication certificate;
perform a registration of the at least one service on the particular device using the authenticated plurality of phone numbers, wherein the registration includes at least one respective handle for accessing the at least one service via each respective phone number of the plurality of phone numbers; and
transmit to the particular device, information related to the at least one respective handle for accessing the at least one service via each respective phone number of the plurality of phone numbers.

10. The device of claim 9, wherein the at least one processor is further configured to:
determine whether a particular device is associated with a plurality of handles for accessing the at least one service on the particular device; and
merge a plurality of message threads associated with the plurality of handles for accessing the at least one service, into a forked message thread when the particular device is associated with the plurality of handles.

11. The device of claim 9, wherein at least one of the plurality of phone numbers is associated with a corresponding subscriber identity module.

12. The device of claim 9, wherein the registration includes a tag identifying a priority of each of the plurality of phone numbers for accessing the at least one service in a particular order.

13. A non-transitory computer-readable medium comprising instructions, which when executed by a computing device, cause the computing device to perform operations comprising:

receiving, at a server, a registration request for registering and associating a plurality of phone numbers for at least one service on a particular device;

performing, by the server, an authentication of a plurality of user identifiers associated with the particular device, the plurality of user identifiers comprising the plurality of phone numbers;

performing, by the server, a registration of the at least one service for the particular device using the authenticated plurality of user identifiers, wherein the registration includes at least one respective handle for accessing the at least one service via each respective user identifier; and transmitting, from the server, to the particular device, information related to the at least one respective handle for accessing the at least one service via each respective user identifier.

14. The non-transitory computer-readable medium of claim 13, wherein the registration request comprises information related to a phone authentication certificate (PAC) that was generated for the particular device, the PAC authenticating that each of the plurality of phone numbers is associated with the particular device.

15. The non-transitory computer-readable medium of claim 14, wherein the operations further comprise:
performing, by the server, a registration of the at least one service for a plurality of devices, wherein the registration includes at least one respective handle for accessing the at least one service on a respective device via each respective user identifier.

16. The non-transitory computer-readable medium of claim 15, wherein the operations further comprise:
performing a batch operation of authenticating the plurality of user identifiers associated with the particular device based at least in part on the PAC.

17. The non-transitory computer-readable medium of claim 16, wherein the performing the authentication of the plurality of user identifiers associated with the particular device comprises performing the authentication of the plurality of user identifiers associated with the particular device based at least in part on the PAC.

18. The non-transitory computer-readable medium of claim 15, wherein the operations further comprise:
determining, by the server, whether a particular device is associated with a plurality of handles for accessing the at least one service on the particular device; and
merging, by the server, a plurality of message threads associated with the plurality of handles for accessing the at least one service, into a forked message thread when the particular device is associated with the plurality of handles.

19. The non-transitory computer-readable medium of claim 15, wherein at least one corresponding user identifier is associated with a corresponding subscriber identity module.

20. The non-transitory computer-readable medium of claim 15, wherein the registration includes a tag identifying a priority of each of the plurality of user identifiers for accessing the at least one service in a particular order.

* * * * *